(12) United States Patent
Boehm et al.

(10) Patent No.: US 10,007,787 B2
(45) Date of Patent: Jun. 26, 2018

(54) RUNTIME RETURN-ORIENTED PROGRAMMING DETECTION

(71) Applicant: International Business Machines Corporation, Armonk, NY (US)

(72) Inventors: Omer Y. Boehm, Haifa (IL); Nitzan Peleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 14/980,045

(22) Filed: Dec. 28, 2015

(65) Prior Publication Data
US 2017/0185775 A1    Jun. 29, 2017

(51) Int. Cl.
G06F 21/52    (2013.01)
G06F 21/55    (2013.01)
G06F 21/56    (2013.01)

(52) U.S. Cl.
CPC ........... *G06F 21/566* (2013.01); *G06F 21/52* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,434,073 | B1 * | 4/2013 | Satish | G06F 21/54 717/120 |
| 8,776,223 | B2 | 7/2014 | Balakrishnan et al. | |
| 9,063,721 | B2 | 6/2015 | Ghose | |
| 9,223,979 | B2 * | 12/2015 | Fischer | G06F 21/566 |
| 9,594,912 | B1 * | 3/2017 | Thioux | G06F 21/577 |
| 2014/0082327 | A1 * | 3/2014 | Ghose | G06F 9/3877 712/205 |
| 2014/0283060 | A1 * | 9/2014 | Beatty | G06F 21/52 726/23 |
| 2015/0047049 | A1 * | 2/2015 | Panchenko | G06F 21/54 726/26 |
| 2015/0128266 | A1 | 5/2015 | Tosa | |
| 2015/0161396 | A1 | 6/2015 | Hentunen | |

(Continued)

FOREIGN PATENT DOCUMENTS

| | | |
|---|---|---|
| WO | 2014070258 A1 | 5/2014 |
| WO | 2014152469 A1 | 9/2014 |

OTHER PUBLICATIONS

Davi, Lucas et al.; "Hardware-Assisted Fine-Grained Control-Flow Integrity: Towards Efficient Protection of Embedded Systems Against Software Exploitation"; Proceedings of the 51st Annual Design Automation Conference; pp. 1-6; Copyright New York, NY 2014.

(Continued)

*Primary Examiner* — Jason C Chiang
(74) *Attorney, Agent, or Firm* — Brian M. Restauro (57) ABSTRACT

Input is received during runtime of a program. The input is a return instruction address of a called function and a return target address of the program. A determination is made whether the instruction immediately prior to the return target address is a call to the called function. If the instruction immediately prior to the return target address is not a call to the called function, a notification is transmitted that return-oriented programming is suspected.

11 Claims, 5 Drawing Sheets

(56) References Cited

U.S. PATENT DOCUMENTS

| | | | |
|---|---|---|---|
| 2015/0213260 A1* | 7/2015 | Park | G06F 21/54 |
| | | | 726/23 |
| 2016/0034687 A1* | 2/2016 | Rhee | G06F 21/52 |
| | | | 726/23 |
| 2016/0179546 A1* | 6/2016 | Yamada | G06F 21/54 |
| | | | 712/240 |
| 2016/0196428 A1* | 7/2016 | Momot | G06F 21/54 |
| | | | 726/23 |
| 2017/0116418 A1* | 4/2017 | Shanmugavelayutham | |
| | | | G06F 21/566 |
| 2017/0124322 A1* | 5/2017 | Guilley | G06F 21/54 |

OTHER PUBLICATIONS

Zhou, Hong Wei et al.; "HDROP: Detecting ROP Attacks Using Performance Monitoring Counters"; Information Security Practice and Experience; 10th International Conference, ISPEC 2014, Fuzhou, China, May 5-8, 2014 Proceedings; pp. 172-186; Copyright Springer International Publishing Switzerland 2014.
Pappas, Vasilis et al.; "Transparent ROP Exploit Mitigation using Indirect Branch Tracing"; Columbia University; pp. 1-16.
Sinnadurai, Saravanan et al.; "Transparent Runtime Shadow Stack: Protection against malicious return address modifications"; pp. 1-4.
Schuster, Felix et al.; "Evaluating the Effectiveness of Current Anti-ROP Defenses"; Technical Report TR-HGI-2014-001; May 5, 2014; pp. 1-22.

\* cited by examiner

```
                                                 306A                                  300
                                                   )
   10009910:48 00 cf 9d bl    100168ac  ← Preceding call      10016918:e9 3f 00 70 ld     r9,112(r31)
       10009914:60 00 00 00 nop         ← Return target      1001691c:d8 09 00 28 stfd   f0,40(r9)
304    ...        306B                                        10016920:60 00 00 00 nop
       100168ac :7c 08 02 a6 mflr   r0   ← Function entry    10016924:39 22 8f b8 addi   r9,r2,-28744
       100168b0:f8 01 00 10 std    r0,16(r1)                 10016928:c8 1f 00 70 lfd    f0,112(r31)
       100168b4:fb e1 ff f8 std    r31,-8(r1)                1001692c:d8 09 00 00 stfd   f0,0(r9)
       100168b8:f8 21 ff 71 stdu   r1,-144(r1)               10016930:60 00 00 00 nop
       100168bc:7c 3f 0b 78 mr     r31,r1                    10016934:39 22 8f 30 addi   r9,r2,-28880
       100168c0:60 00 00 00 nop                              10016938:c8 09 00 00 lfd    f0,0(r9)
       100168c4:39 22 8f 58 addi   r9,r2,-28840              1001693c:e9 3f 00 70 ld     r9,112(r31)
       100168c8:e9 29 00 00 ld     r9,0(r9)                  10016940:d8 09 00 00 stfd   f0,0(r9)
       100168cc:2f a9 00 00 cmpdi  cr7,r9,0                  10016944:60 00 00 00 nop
       100168d0:41 9e 00 34 beq    cr7,10016904              10016948:39 22 8f 38 addi   r9,r2,-28872
       100168d4:60 00 00 00 nop                              1001694c:c8 09 00 00 lfd    f0,0(r9)
       100168d8:39 22 8f 58 addi   r9,r2,-28840              10016950:e9 3f 00 70 ld     r9,112(r31)
       100168dc:c8 09 00 00 lfd    f0,0(r9)                  10016954:d8 09 00 10 stfd   f0,16(r9)
       100168e0:d8 1f 00 70 stfd   f0,112(r31)               10016958:60 00 00 00 nop
       100168e4:60 00 00 00 nop                              1001695c:39 22 8f 30 addi   r9,r2,-28880
       100168e8:39 22 8f 58 addi   r9,r2,-28840              10016960:f0 00 04 d0 xxlxor vs0,vs0,vs0
       100168ec:e9 29 00 00 ld     r9,0(r9)                  10016964:d8 09 00 00 stfd   f0,0(r9)
       100168f0:c8 09 00 28 lfd    f0,40(r9)                 10016968:60 00 00 00 nop
       100168f4:60 00 00 00 nop                              1001696c:39 22 8f 38 addi   r9,r2,-28872
       100168f8:39 22 8f 58 addi   r9,r2,-28840              10016970:f0 00 04 d0 xxlxor vs0,vs0,vs0
       100168fc:d8 09 00 00 stfd   f0,0(r9)                  10016974:d8 09 00 00 stfd   f0,0(r9)
       10016900:48 00 00 0c b      1001690c                  10016978:38 3f 00 90 addi   r1,r31,144
       10016904:4b ff f2 dd bl     10015be0                  1001697c:e8 01 00 10 ld     r0,16(r1)
       10016908:f8 7f 00 70 std    r3,112(r31)               10016980:7c 08 03 a6 mtlr   r0
       1001690c:60 00 00 00 nop                              10016984:eb e1 ff f8 ld     r31,-8(r1)
       10016910:39 22 8f b8 addi   r9,r2,-28744      302 ~   10016988 :4e 80 00 20 blr   ← Return instruction
       10016914:c8 09 00 00 lfd    f0,0(r9)                  1001698c:00 00 00 00 .long 0x0
                                                             10016990:00 00 00 01 .long 0x1
                                                             10016994:80 01 00 01 lwz    r0,1(r1)
                                                              ...

RUNTIME RETURN-ORIENTED PROGRAMMING DETECTION

BACKGROUND OF THE INVENTION

The present invention relates generally to the field of return-oriented programming (ROP), and more particularly to detecting the presence of ROP at runtime.

Return-oriented programming (or ROP) is a computer security exploit technique that allows an 'attacker' (i.e., a computer hacker) to execute code in the presence of security defenses such as Data Execution Prevention (DEP). In an ROP attack, an attacker gains control of the call stack to hijack program control flow and then executes carefully chosen machine instruction sequences, called "gadgets". Each gadget may end in a return instruction and is located in a subroutine within the existing program and/or shared library code. Chained together, these gadgets allow an attacker to perform arbitrary operations on a machine employing defenses that thwart simpler attacks.

SUMMARY

Embodiments of the present invention include a method, computer program product, and system for detecting the presence of return-oriented programming at runtime. In one embodiment, input is received during runtime of a program. The input is a return instruction address of a called function and a return target address of the program. A determination is made whether the instruction immediately prior to the return target address is a call to the called function. If the instruction immediately prior to the return target address is not a call to the called function, a notification is transmitted that return-oriented programming is suspected.

DETAILED DESCRIPTION

Some embodiments of the present invention recognize that the idea behind using return-oriented programming (ROP) in an exploit is to use an existing program's code, but to alter the control flow of execution to perform a different task. Typically, a hacker would attempt to execute malicious actions by using certain parts of a benign program's code called "gadgets". Each gadget typically ends in a return instruction and by stringing multiple gadgets together, the hacker is able to control the program and execute a function other than what was intended by the original programmer.

Embodiments of the present invention recognize that there may be a method, computer program product, and system to detect the presence of return-oriented programming at runtime. Runtime may be defined as the period of time during which a computer program is executing. The ROP may be detected during runtime by determining that the return instruction address for a called function is not found in the control flow graph of the called function. A control flow graph (CFG) in computer science is a graph representation of all paths that may be traversed through a program during the program's execution.

Figure 1:
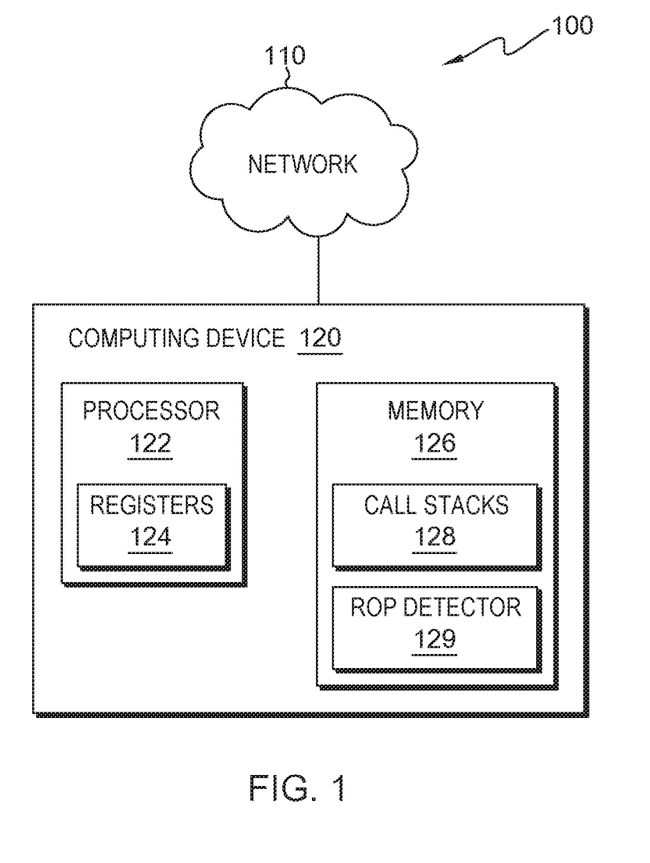
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes computing device 120 connected to network 110. In an example embodiment, utilizing network 110, computing device 120 may communicate with any other device (not shown) in computing environment 100. In example embodiments, computing environment 100 may include other computing devices not shown such as smartwatches, cell phones, smartphones, phablets, tablet computers, laptop computers, desktop computers, other computer servers or any other computer system known in the art, interconnected with computing device 120 over network 110.

In example embodiments, computing device 120 may connect to network 110 which enables computing device 120 to access other computing devices and/or data not directly stored on computing device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between computing device 120 and other computing devices (not shown) within computing environment 100, in accordance with embodiments of the present invention.

In various embodiments of the present invention, computing device 120 may be a laptop, tablet or netbook personal computer (PC), a desktop computer, a personal digital assistant (PDA), a smartphone, or any other handheld, programmable electronic device capable of communicating with any computing device within computing environment 100. In certain embodiments, computing device 120 represents a computer system utilizing clustered computers and components (e.g., database server computers, application server computers, etc.) that act as a single pool of seamless resources when accessed by elements of computing environment 100. In general, computing device 120 is representative of any electronic device or combination of electronic devices capable of executing computer readable program instructions. Computing environment 100 may include any number of computing device 120. Computing device 120 may include components as depicted and described in further detail with respect to FIG. 5, in accordance with embodiments of the present invention.

According to embodiments of the present invention, computing device 120 includes processor 122, registers 124, memory 126, call stacks 128, and ROP detector 129. In one embodiment, computing device 120 may include a single processor 122. In another embodiment, computing device 120 may include more than one processor 122. Processor 122 may be part of a computer system as depicted by processor(s) 501 in FIG. 5. In other embodiments, processor 122 may be a single core processor or a multi-core processor or multiple hardware threads in simultaneous multithreading. A core is an independent processing unit which allow for enhanced performance, reduced power consumption, and more efficient simultaneous processing of multiple tasks for the processor. Each core in a multi-core processor has the ability to read and execute program instructions such as add, move data and branch. Since multiple cores can run multiple processes at the same time, the overall speed for executing the program instructions is increased.

In an embodiment of the present invention, processor 122 includes registers 124. Processor 122 may be a computer processor that incorporates the functions of a central processing unit (CPU) of a computer on a single integrated circuit (IC), or at most a few integrated circuits. The computer processor is a multipurpose, programmable device that accepts digital data as input, processes it according to instructions stored in its memory, and provides results as output. The processor is an example of sequential digital logic, as it has internal memory. Processors operate on numbers and symbols represented in the binary numeral system.

In one embodiment, registers 124 may be a small amount of storage available as part of a processor 122. Such registers are typically addressed by mechanisms other than main memory and can be accessed faster. In an embodiment, computing device 120 may load data from a larger memory into registers such as registers 124 where the data is used for arithmetic, is manipulated, tested by machine instructions, or stored to another memory location. Manipulated data is then often stored back into main memory, either by the same instruction or a subsequent one.

In an embodiment, memory 126 includes call stacks 128 and ROP detector 129. Memory 126 may be storage that may be written to and/or read by computing device 120. In one embodiment, memory 126 resides on computing device 120. In other embodiments, memory 126 may reside on any other device (not shown) in computing environment 100, in cloud storage or on another computing device accessible via network 110. In yet another embodiment, memory 126 may represent multiple storage devices within computing device 120. Memory 126 may be part of a computer system as depicted by memory 502 in FIG. 5. Memory 126 may be implemented using any volatile or non-volatile storage media for storing information, as known in the art. For example, memory 126 may be implemented with a tape library, optical library, one or more independent hard disk drives, multiple hard disk drives in a redundant array of independent disks (RAID), solid-state drives (SSD), or random access memory (RAM). Similarly, memory 126 may be implemented with any suitable storage architecture known in the art, such as a relational database, an object-oriented database, or one or more tables. In an embodiment of the present invention, data sent or received by computing device 120 may be stored to memory 126. An example of data stored to memory 126 may include executable programs which may be monitored by ROP detector 129.

In an embodiment of the present invention, call stacks 128 may a stack data structure that stores information about the active functions or subroutines of a computer program. In an embodiment, call stacks 128 may also be known as an execution stack, control stack, run-time stack, or machine stack, and is often shortened to just "the stack". Although maintenance of call stacks 128 is important for the proper execution of most software, the details are normally hidden and automatic in high-level programming languages. In an embodiment, many computer instruction sets provide special instructions for manipulating stacks.

In various embodiments, call stacks 128 may be used to keep track of the point to which each active function should return control when it finishes executing. For example, as a program is running, the program has control. When a function is called, control is passed to the function and control is passed back to the calling function when the function completes execution. An active function is one that has been called but is yet to complete execution after which control should be handed back to the point of call. Such activations of functions may be nested to any level, hence the stack structure. If, for example, a function 'X' calls a function 'Y' from four different places, 'Y' must know where to return when its execution completes. To accomplish this, the address following the call instruction, the return target address, is often pushed onto call stacks 128 with each call.

In an embodiment, ROP detector 129 may be a hardware component, logic, program, subprogram of a larger program, application, plurality of applications or mobile application software which detects the presence of return-oriented programming at runtime. Mobile application software, or an "app," is a computer program designed to run on smartphones, phablets, tablet computers and other mobile devices. In one embodiment, ROP detector 129 may be code residing on computing device 120. In another embodiment, ROP detector 129 may be included as a part of an operating system (not shown). In yet another embodiment, ROP detector 129 may work in conjunction with other programs, applications, etc., found on computing device 120 or in computing environment 100. In yet another embodiment, ROP detector 129 may be found on other computing devices (not shown) in computing environment 100 which are interconnected to computing device 120 via network 110. In yet another embodiment, part or all the logic of ROP detector 129 is included in the hardware comprising computing device 120.

According to embodiments of the present invention, ROP detector 129 determines whether a program includes return-oriented programming and sends a notification to a hardware or software component or to a user if ROP is suspected. In an embodiment, ROP detector 129 uses the control flow graph (CFG) of the called function and confirms whether the return instruction address is included. In an embodiment, if the return instruction address is not included ROP is suspected.

Figure 2:
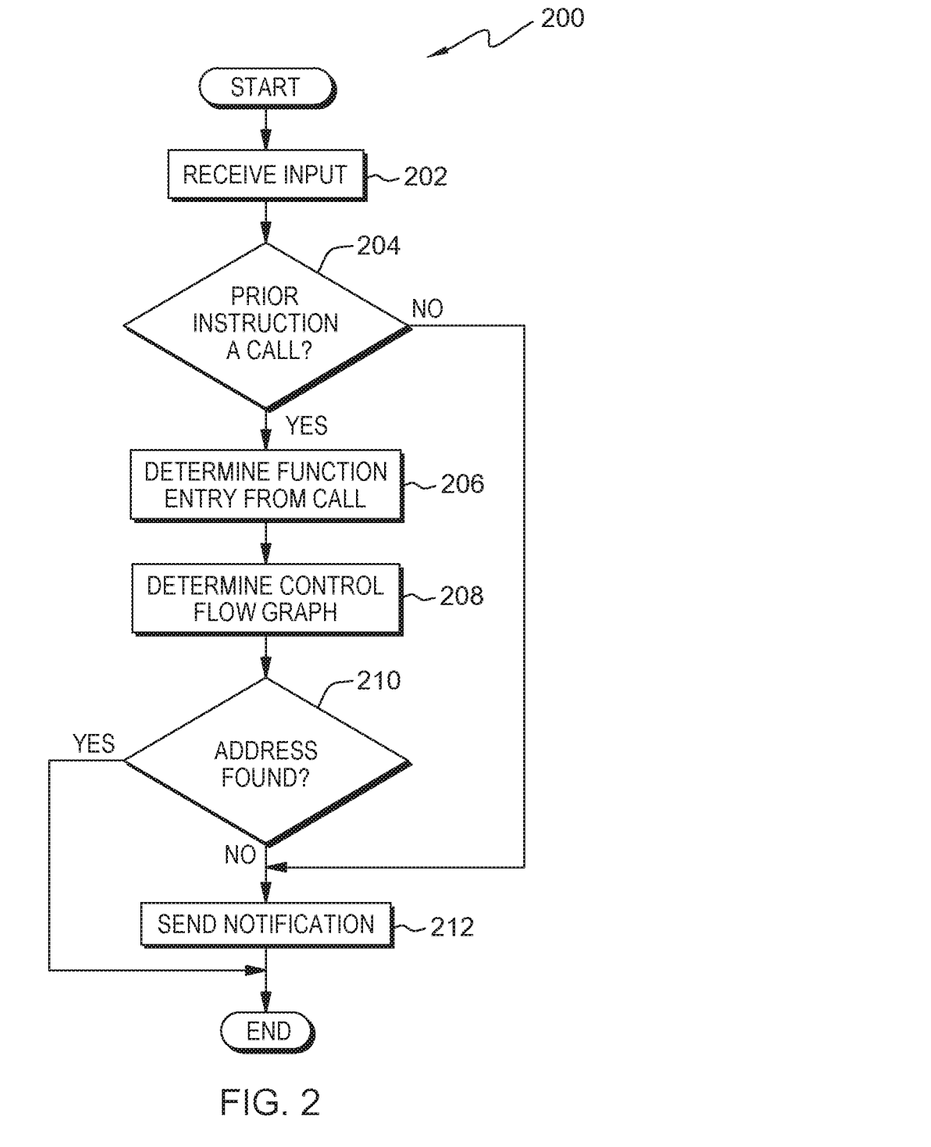
FIG. 2 is a flowchart depicting operational steps of logic triggered to detect the presence of return-oriented programming at runtime, in accordance with an embodiment of the present invention.

FIG. 2 is a flowchart of workflow 200 representing operational steps of logic triggered to detect the presence of return-oriented programming during runtime. In one embodiment, ROP detector 129 performs the operational steps of workflow 200 as shown in FIG. 2. In an alternative embodiment, any other program, while working with ROP detector 129, may perform the operational steps of workflow 200. In an embodiment, ROP detector 129 may invoke workflow 200 upon the occurrence of a trigger, such as hardware branch miss-prediction of a return instruction target address.

Figure 3:
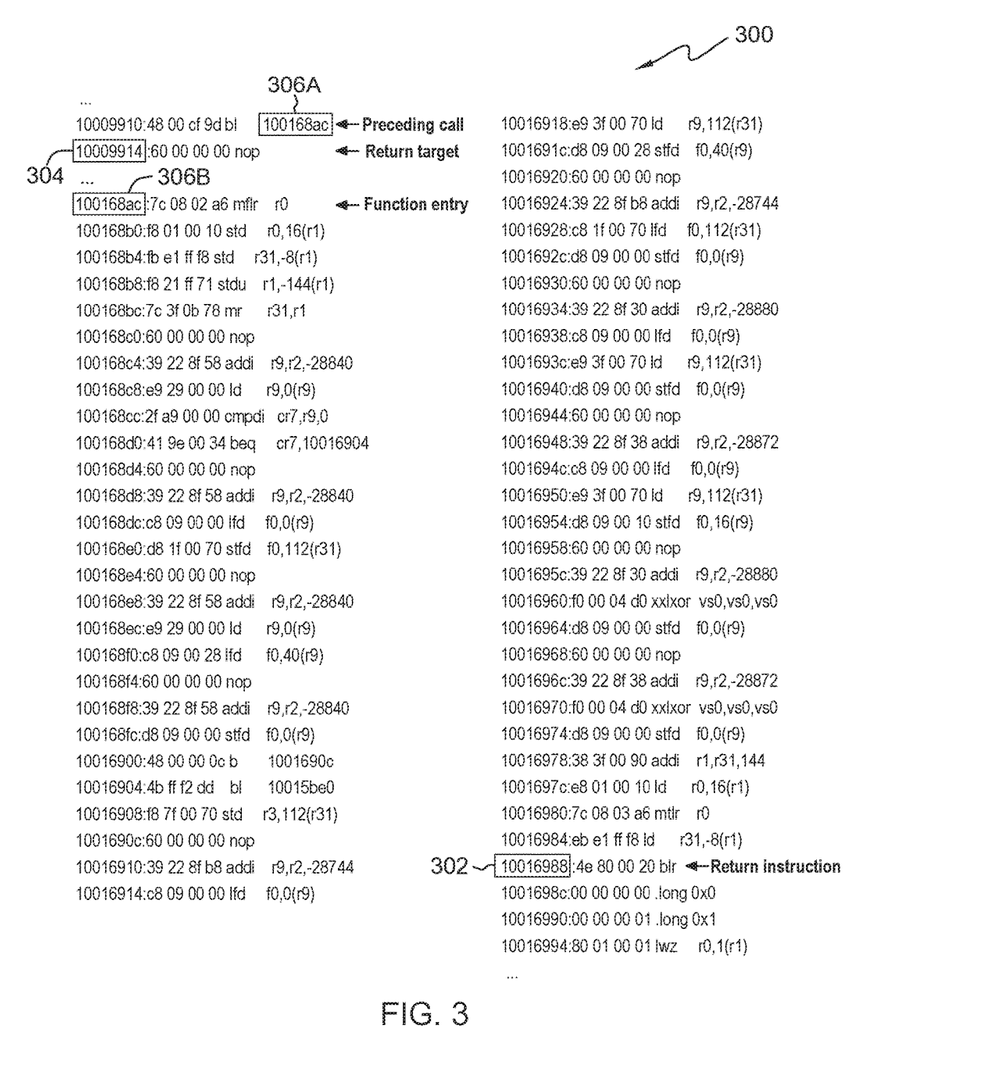
FIG. 3 is an example depiction of a program which includes a function, in accordance with an embodiment of the present invention.

In an embodiment, ROP detector 129 receives input (step 202). In other words, ROP detector 129 is triggered by an event in the monitored program during runtime and ROP detector 129 receives the return instruction address of a called function and the return target address. The triggering logic may be inserted to the application with static or dynamic code instrumentation, it can be part of a system call, it can be part of an interrupt handler, or any number of other triggering methods known in the art. The return target address is set by a call instruction. In one embodiment, the call and/or the return operations may be implemented using a single instruction. In another embodiment, the call and/or the return operations may be implemented using multiple instructions. In one embodiment of the present invention, the return target address is retrieved by the trigger from call stacks 128. In another embodiment the return target address information is retrieved from register values. In another embodiment the return target address information is retrieved in other methods. For example, FIG. 3 shows return instruction address 302 and return target address 304.

In an embodiment, ROP detector 129 determines whether the return target address prior instruction is a call (decision step 204). In other words, ROP detector 129 determines whether the preceding instruction in the program shown in FIG. 3 is a call to a function. In one embodiment, ROP detector 129 determines that the preceding instruction is not a call to a function (decision step 204, NO branch) and ROP detector 129 sends a notification that ROP is suspected (step 212). In another embodiment, ROP detector 129 determines that the preceding instruction is a call to a function (decision step 204, YES branch) and ROP detector 129 determines the function entry (step 206).

In an embodiment, ROP detector 129 determines the function entry (step 206). In other words, based on the preceding call target address, ROP detector 129 determines the function entry address. The function entry address is the entry point into the function called in the call instruction. The function entry address is needed to determine the control flow graph. In an embodiment of the present invention, ROP detector 129 determines the function entry from the call instruction target address. For example, FIG. 3 shows a preceding call with target address 306A. This target address is the function entry address 306B in FIG. 3 which is the first line of the called function.

Figure 4:
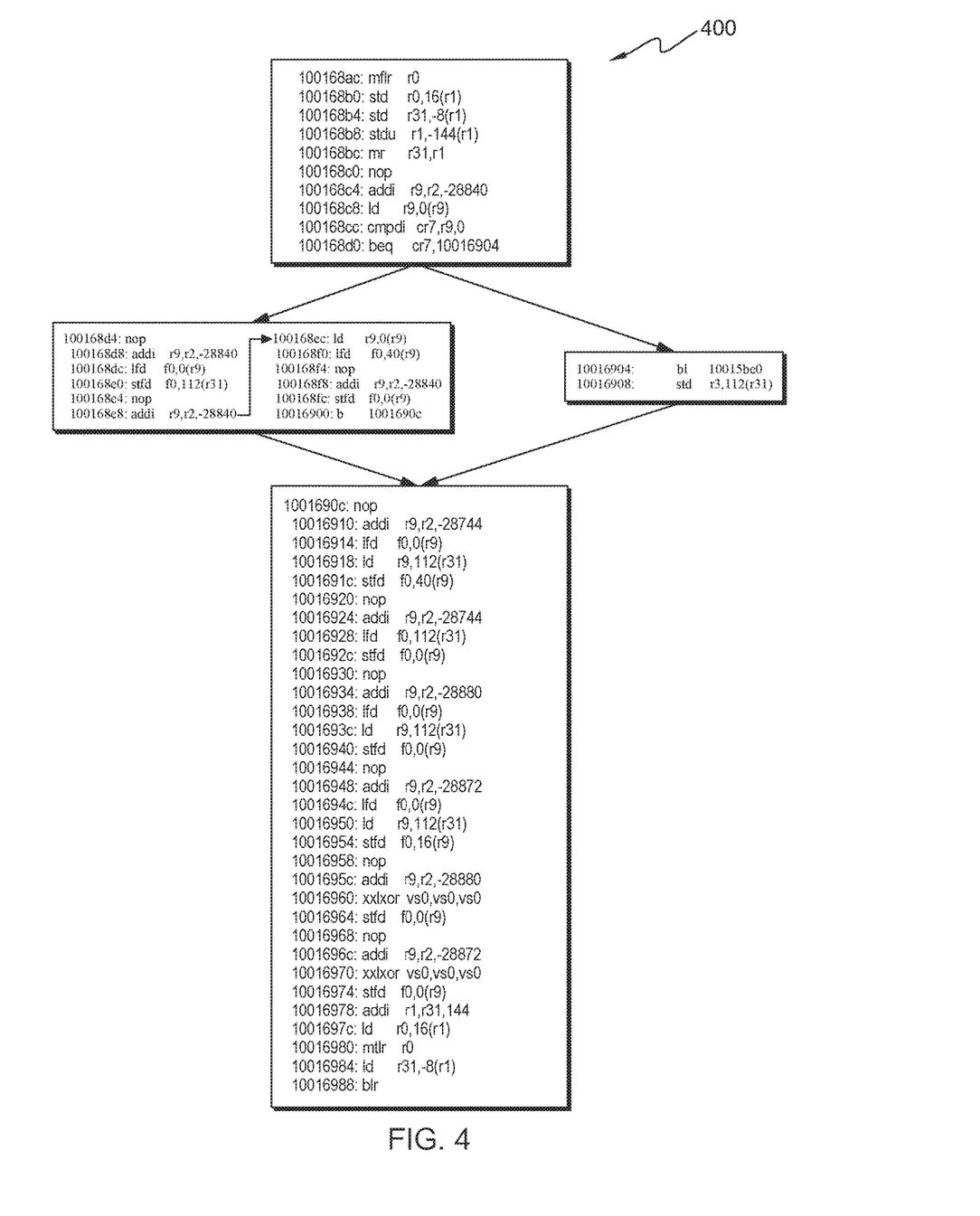
FIG. 4 is an example control flow graph for the function in FIG. 3, in accordance with an embodiment of the present invention.

In an embodiment, ROP detector 129 determines the control flow graph or CFG (step 208). In other words, ROP detector 129 determines the CFG associated with the called function. ROP detector 129 also determines the address space of the called function. The CFG of the called function is a graph representation of all paths that may be traversed through the function during the function's execution. The address space is the space in memory used by the function. Those skilled in the art will recognize that there are several methods for determining the CFG. The call instruction target address and the CFG are found using known methods of binary analysis. In an embodiment, the binary analysis may be performed offline and then the results of the binary analysis are used during runtime. In another embodiment, it may be performed during runtime. In one embodiment, ROP detector 129, in conjunction with processor 122, determines the CFG for the called function. In other embodiments, the function address space may be obtained from additional information existing in the executable file or the shared library file. For example, the CFG for the function shown in FIG. 3 starting from the function entry address 306B is displayed in FIG. 4.

In an embodiment, ROP detector 129 determines whether the return instruction address was found (decision step 210). In other words, ROP detector 129 determines whether the return instruction address from the trigger is found in the CFG of the called function or in the address space of the function. In one embodiment, ROP detector 129 determines the return instruction address is found (decision step 210, YES branch), and ROP detector 129 successfully ends. In another embodiment, ROP detector 129 determines the return instruction address is not found (decision step 210, NO branch) and ROP detector 129 sends a notification that ROP is suspected (step 212).

In an embodiment, ROP detector 129 sends a notification (step 212). In other words, in response to determining that ROP is suspected (decision step 204 and/or decision step 210), ROP detector 129 sends (i.e., transmits) a notification indicating that an ROP is suspected. In an embodiment, ROP detector 129 may terminate the program execution. In another embodiment, ROP detector 129 may log the information regarding the ROP detection event. In yet another embodiment, a notification is sent to a user. In yet another embodiment, a notification is sent to a monitoring component which is not a part of the ROP detection logic and the program stops executing and waits for input from the monitoring component. In an embodiment of the present invention, ROP detector 129 sends a notification to another component on computing device 120. For example, an ROP detector may send a notification and stop the program executing the function shown in FIG. 3 if the return instruction address is not return instruction address 302 in FIG. 3.

Figure 5:
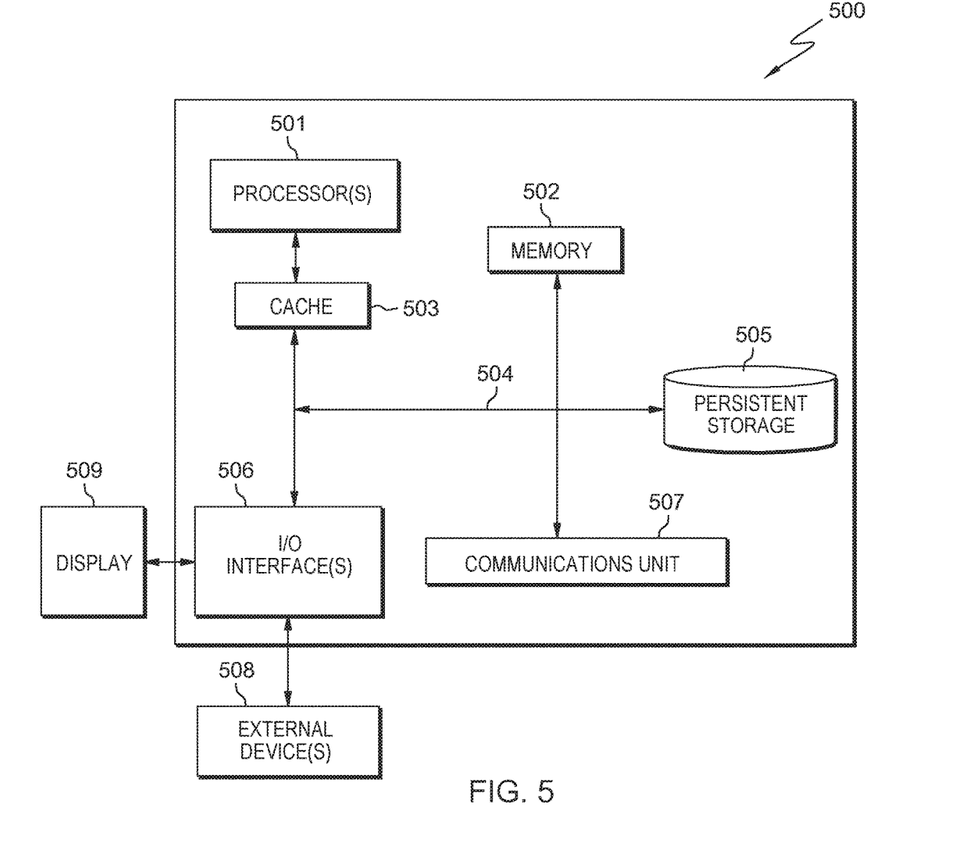
FIG. 5 depicts a block diagram of the components of the computing system of FIG. 1, in accordance with an embodiment of the present invention.

FIG. 5 depicts computer system 500 which is an example of a system that includes ROP detector 129. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for logic triggered to detect a presence of return-oriented programming at runtime, the method comprising:
   receiving, by one or more computer processors, an input during runtime of a program, wherein the input is a return instruction address of a called function and a return target address of the program;
   determining, by one or more computer processors, whether an instruction immediately prior to the return target address is a call to the called function;
   responsive to determining that the instruction immediately prior to the return target address is a call to the called function, determining, by one or more computer processors, a function entry address of the called function;
   determining, by one or more computer processors, a control flow graph associated with the called function using the determined function entry address, wherein the control flow graph is determined using binary analysis;
   determining, by one or more computer processors, that the return instruction address of the called function is not found in the control flow graph associated with the called function, and
   responsive to determining that the return instruction address of the called function is not found in the control flow graph associated with the called function, transmitting, by one or more computer processors, a notification that return-oriented programming is suspected, wherein the notification is transmitted to a user.

2. The method of claim 1, further comprising:
   responsive to determining that the instruction immediately prior to the return target address is a call to the called function, determining, by one or more computer processors, an address space associated with the called function.

3. The method of claim 2, further comprising:
   responsive to determining that the return instruction address of the called function is not found in the address space associated with the called function, transmitting, by one or more computer processors, a notification that return-oriented programming is suspected.

4. The method of claim 1, wherein the notification is transmitted to a monitoring component and the program stops executing.

5. A computer program product for logic triggered to detect a presence of return-oriented programming at runtime, the computer program product comprising:
   one or more computer readable storage media; and
   program instructions stored on the one or more computer readable storage media, the program instructions comprising:
   program instructions to receive an input during runtime of a program, wherein the input is a return instruction address of a called function and a return target address of the program;
   program instructions to determine whether an instruction immediately prior to the return target address is a call to the called function;
   responsive to determining that the instruction immediately prior to the return target address is a call to the called function, program instructions to determine a function entry address of the called function;
   program instructions to determine a control flow graph associated with the called function using the determined function entry address, wherein the control flow graph is determined using binary analysis;
   program instructions to determine that the return instruction address of the called function is not found in the control flow graph associated with the called function, and
   responsive to determining that the return instruction address of the called function is not found in the control flow graph associated with the called function, program instructions to transmit a notification that return-oriented programming is suspected, wherein the notification is transmitted to a user.

6. The computer program product of claim 5, further comprising program instructions stored on the one or more computer readable storage media, to:
   responsive to determining that the instruction immediately prior to the return target address is a call to the called function, determine an address space associated with the called function.

7. The computer program product of claim 6, further comprising program instructions stored on the one or more computer readable storage media, to:
   responsive to determining that the return instruction address of the called function is not found in the address space associated with the called function, transmit a notification that return-oriented programming is suspected.

8. The computer program product of claim 5, wherein the notification is transmitted to a monitoring component and the program stops executing.

9. A computer system for logic triggered to detect a presence of return-oriented programming at runtime, the computer system comprising:
  one or more computer processors;
  one or more computer readable storage media; and
  program instructions stored on the one or more computer readable storage media for execution by at least one of the one or more computer processors, the program instructions comprising:
  program instructions to receive an input during runtime of a program, wherein the input is a return instruction address of a called function and a return target address of the program;
  program instructions to determine whether an instruction immediately prior to the return target address is a call to the called function;
  responsive to determining that the instruction immediately prior to the return target address is a call to the called function, program instructions to determine a function entry address of the called function;
  program instructions to determine a control flow graph associated with the called function using the determined function entry address, wherein the control flow graph is determined using binary analysis;
  program instructions to determine that the return instruction address of the called function is not found in the control flow graph associated with the called function, and
  responsive to determining that the return instruction address of the called function is not found in the control flow graph associated with the called function, program instructions to transmit a notification that return-oriented programming is suspected, wherein the notification is transmitted to a user.

10. The computer system of claim 9, further comprising program instructions stored on the one or more computer readable storage media for execution by at least one of the one or more computer processors, to:
  responsive to determining that the instruction immediately prior to the return target address is a call to the called function, determine an address space associated with the called function.

11. The computer system of claim 10, further comprising program instructions stored on the one or more computer readable storage media for execution by at least one of the one or more computer processors, to:
  responsive to determining that the return instruction address of the called function is not found in the address space associated with the called function, transmit a notification that return-oriented programming is suspected.

* * * * *